US 8,312,287 B2

United States Patent
Lim et al.

(10) Patent No.: US 8,312,287 B2
(45) Date of Patent: Nov. 13, 2012

(54) APPARATUS AND METHOD FOR DYNAMICALLY CHANGING A PASSWORD

(75) Inventors: Woo-Gyu Lim, Seoul (KR); Young-Hoon Min, Suwon-si (KR); Jin-Woo Nam, Seoul (KR)

(73) Assignee: Samsung Electronics Co., Ltd (KR)

( * ) Notice: Subject to any disclaimer, the term of this patent is extended or adjusted under 35 U.S.C. 154(b) by 1384 days.

(21) Appl. No.: 11/762,650

(22) Filed: Jun. 13, 2007

(65) Prior Publication Data

US 2007/0294538 A1  Dec. 20, 2007

(30) Foreign Application Priority Data

Jun. 16, 2006 (KR) .......................... 10-2006-0054488

(51) Int. Cl.
*G06F 21/00* (2006.01)
(52) U.S. Cl. ....................................... 713/184; 713/182
(58) Field of Classification Search .................. None
See application file for complete search history.

(56) References Cited

U.S. PATENT DOCUMENTS

| 5,060,263 A * | 10/1991 | Bosen et al. ................... 713/184 |
| 6,826,686 B1 * | 11/2004 | Peyravian et al. ............ 713/168 |
| 6,854,001 B2 * | 2/2005 | Good et al. .................... 708/174 |

FOREIGN PATENT DOCUMENTS

| KR | 1020000038664 | 7/2000 |
| KR | 1020010070785 | 7/2001 |
| KR | 1020030050576 | 6/2003 |
| KR | 1020040006395 | 1/2004 |
| WO | WO 02/24757 | 3/2002 |

* cited by examiner

*Primary Examiner* — Philip Chea
*Assistant Examiner* — Carlton Johnson
(74) *Attorney, Agent, or Firm* — The Farrell Law Firm, P.C.

(57) ABSTRACT

An apparatus and method for dynamically changing a password are provided. In the method, a random number is generated, and an original password and an operator are checked. The original password is changed by performing an operation of the random number and the original password based on the operator. Accordingly, the password exposure can be prevented and the personal information and asset information can be protected without using additional devices.

6 Claims, 3 Drawing Sheets

APPARATUS AND METHOD FOR DYNAMICALLY CHANGING A PASSWORD

PRIORITY

This application claims priority under 35 U.S.C. §119 to an application filed in the Korean Intellectual Property Office on Jun. 16, 2006 and assigned Serial No. 2006-54488, the contents of which are incorporated herein by reference.

BACKGROUND OF THE INVENTION

1. Field of the Invention

The present invention relates generally to an apparatus and method for setting a password, and in particular, to an apparatus and method for dynamically changing a password using a random number.

2. Description of the Related Art

A digital age is rapidly coming with the development of electrical and electronic industries and will be accelerated in the future. The digitalization in all fields of our life is rapidly in progress. Thus, the interest in protection of personal information is increasing.

A password is most widely used to protect personal information and asset information. Such a protection method allows a connection to a specific system or access to personal information using a password set by a user. Accordingly, studies on encryption techniques for preventing a password exposure are conducted.

As described above, the use of a password for the protection of personal information and asset information is simple and widely used. However, when the password is exposed, anyone can easily access the personal information and asset information. Examples of systems using passwords include personal electronic devices such as mobile communication terminals and computers, bank accounts, various Internet sites, and domestic electronic keys. When the password of one of the systems is exposed, an unauthorized person can access other systems using the same password as the exposed password. Consequently, a series of damages can be caused.

In order to prevent the password exposure, it is recommended for a user to periodically change the password, or an authentication key method using an encryption system verified by a reliable agency is used. However, as described above, the password is required in many fields, including personal electronic devices such as mobile communication terminals and computers, bank accounts, various Internet sites, and domestic electronic keys. Thus, the periodic password change imposes a heavy burden on the users.

When an additional device such as an authentication key or a card is used, other persons cannot access the personal information and asset information without the additional device. In addition, when the additional device is provided to other persons, the personal information and the asset information may be easily exposed to other persons.

SUMMARY OF THE INVENTION

An aspect of the present invention is to substantially solve at least the above problems and/or disadvantages and to provide at least the advantages below. Accordingly, an aspect of the present invention is to provide an apparatus and method for performing an authentication procedure using a password.

Another aspect of the present invention is to provide an apparatus and method for performing an authentication procedure through a dynamic password change.

A further aspect of the present invention is to provide an apparatus and method for dynamically changing a password using a random number.

A still further aspect of the present invention is to provide an apparatus and method for dynamically changing a password using a random number, a password, and an operator set by a user.

According to an aspect of the present invention, there is provided a password authentication method that includes generating a random number; checking a password inputted by a user; checking an original password and an operator, and changing the original password by performing an operation of the random number and the original password based on the operator; and determining whether to accept a password authentication by comparing the inputted password with the changed password.

According to another aspect of the present invention, there is provided a method for dynamically changing a password that includes generating a random number; checking an original password and an operator; and changing the original password by performing an operation of the random number and the original password based on the operator.

According to a further aspect of the present invention, there is provided an apparatus for dynamically changing a password that includes a storage unit for storing an original password and an operator previously set; a random number generation unit for generating a random number; and a dynamic password generation unit for changing the original password by performing an operation of the original password and the random number based on the operator.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE EXEMPLARY EMBODIMENTS

Exemplary embodiments of the present invention will be described herein below with reference to the accompanying drawings. In the following description, well-known functions or constructions are not described in detail since they would obscure the invention in unnecessary detail.

The present invention is intended to provides an apparatus and method for dynamically changing a password using a random number. The apparatus and method for dynamically changing the password according to an exemplary embodiment of the present invention can be applied to various fields requiring the protection of personal information and asset information and the password authentication, such as personal electronic devices (e.g., mobile communication terminals and computers), banking systems, various Internet sites, and domestic electronic keys.

In the following description, an original password key previously stored by a user will be referred to as a first password key, and a password key changed using a random number will be referred to as a second password key.

Figure 1:
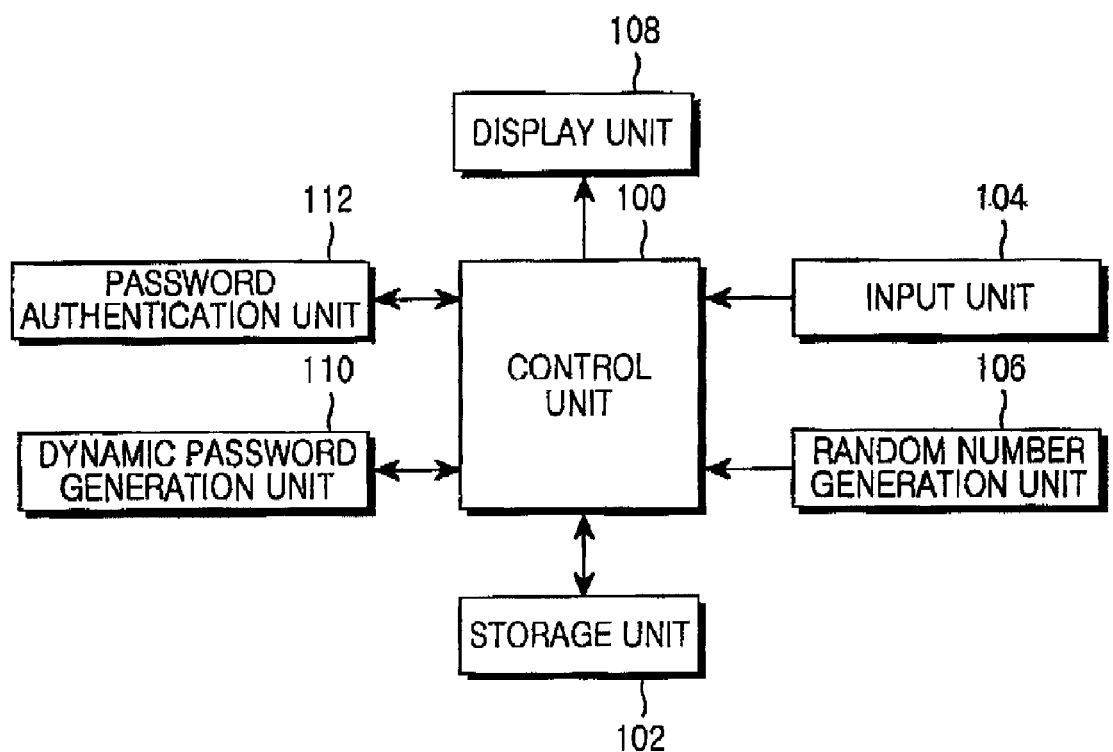
FIG. 1 is a block diagram illustrating an apparatus for dynamically changing a password according to an exemplary embodiment of the present invention.

FIG. 1 is a block diagram illustrating an apparatus for dynamically changing a password according to an exemplary embodiment of the present invention.

Referring to FIG. 1, the apparatus for dynamically changing a password includes a control unit 100, a storage unit 102, an input unit 104, a random number generation unit 106, a display unit 108, a dynamic password generation unit 110, and a password authentication unit 112.

The control unit 100 controls an overall operation of the apparatus of the present invention. Specifically, the control unit 100 controls an authentication of a user password by dynamically changing the password using a password and operator set by the user and a random number generated by the random number generation unit 106.

During a user registration procedure, the storage unit 102 stores a first password key and an operator that the user inputs through the input unit 104. The operator includes all mathematical operators, e.g., four fundamental operators (+, −, ×, ÷), modulo operator (%), and log operator.

During the user registration procedure, the input unit 104 provides the first password key and the operator to the control unit 100. When the user tries the password authentication, the input unit 104 provides the input password to the control unit 100. At this point, the user inputs a password for performing the password authentication using the first password key, the operator, and the random number displayed on the display unit 108.

When the user tries the password authentication, the random number generation unit 106 generates a random number used for dynamically changing the first password key under control of the control unit 100. Because the random number is a number that is randomly generated from the system, no one can predict which number will be generated.

The display unit 108 displays status information generated during operations, characters input by the user etc. Specifically, when the user tries the password authentication, the display unit 108 displays the random number generated by the random number generation unit 106.

The dynamic password generation unit 110 generates a second password key using the first password key and the operator stored in the storage unit 102 and the random number generated by the random number generation unit 106. The dynamic password generation unit 110 generates the second password key using Equation (1) as expressed below:

$$\text{First Password Key} + \text{Operator} + \text{Random Number} = \text{Second Password Key} \quad (1)$$

For example, when the first password key is "1234", the operator is "+" and the random number is "3615", the dynamic password generation unit 110 generates the second password key of "4849" (=1234+3615).

Upon the trial of the password authentication, the password authentication unit 112 determines whether to accept the password authentication by comparing the password input through the input unit 104 with the second password key generated by the dynamic password generation unit 110. That is, when the input password coincides with the second password key, the password authentication unit 112 accepts the authentication of the inputted password so that the user is allowed to access the personal information and asset information. When the input password does not coincide with the second password key, the password authentication unit 112 rejects the authentication of the input password so that the user is not allowed to access the personal information and asset information.

The control unit 100 can be designed to perform the functions of the random number generation unit 106, the dynamic password generation unit 110, and the password authentication unit 112. The separate implementation in FIG. 1 is merely for convenience of explanation. That is, in the real implementation, the control unit 100 can be designed to perform all or some of the functions of these units.

Figure 2:
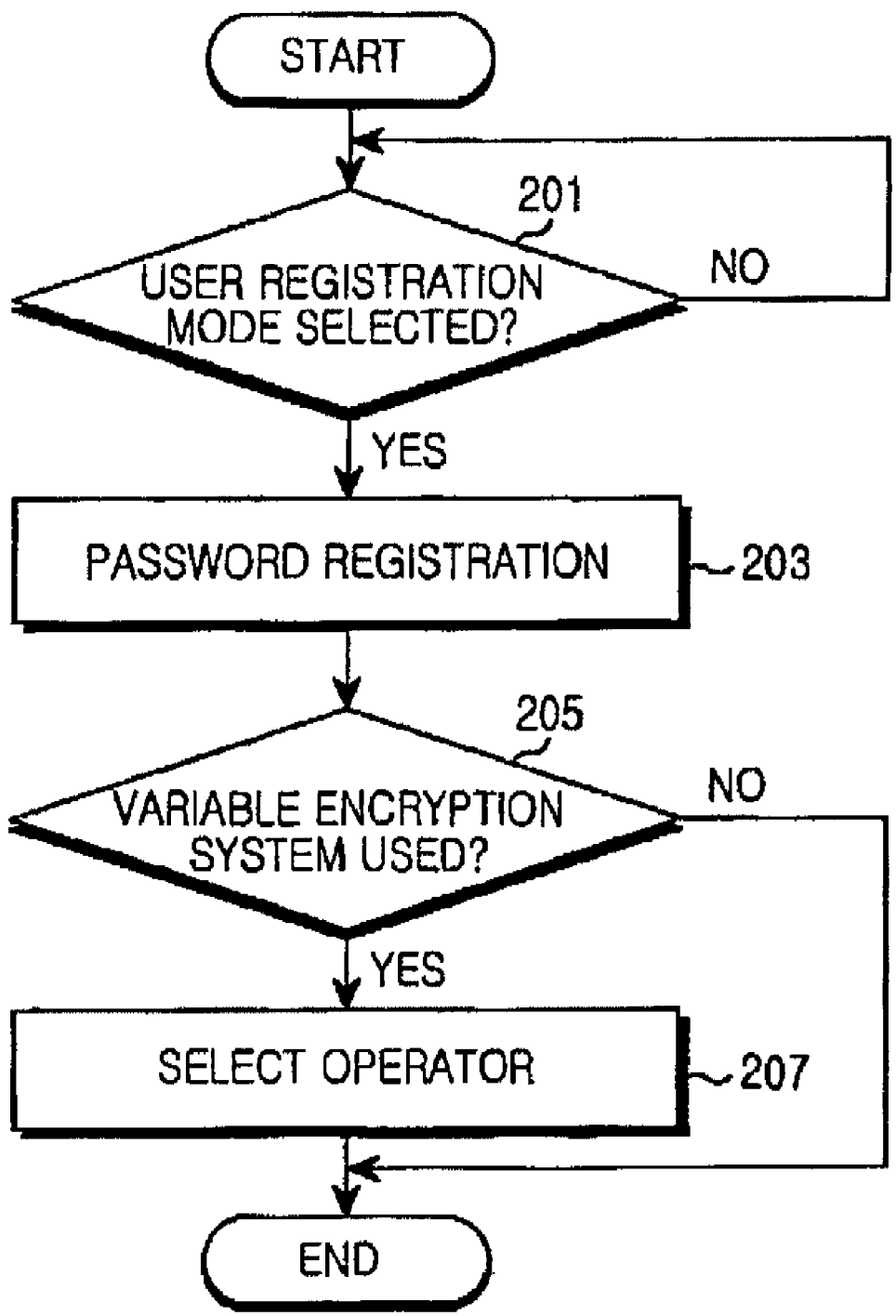
FIG. 2 is a flowchart illustrating a method for setting a password according to an exemplary embodiment of the present invention.

FIG. 2 is a flowchart illustrating a method for setting the password according to an exemplary embodiment of the present invention.

Referring to FIG. 2, in step 201 the apparatus for dynamically changing the password determines if a user registration mode is selected by a user's key manipulation.

In step 203, upon a user selecting the user registration mode, the apparatus determines if a user's password key is registered.

In step 205, when the user's password key is registered, the apparatus determines if a variable encryption system is used. The apparatus terminates the algorithm when the variable encryption system is not used.

In step 207, when the variable encryption system is used, the apparatus selects an operator for generating a new password key using the registered password key. The operator includes all mathematical operators, e.g., four fundamental operators (+, −, ×, ÷), modulo operator (%), and log operator. Thereafter, the apparatus terminates the algorithm.

Figure 3:
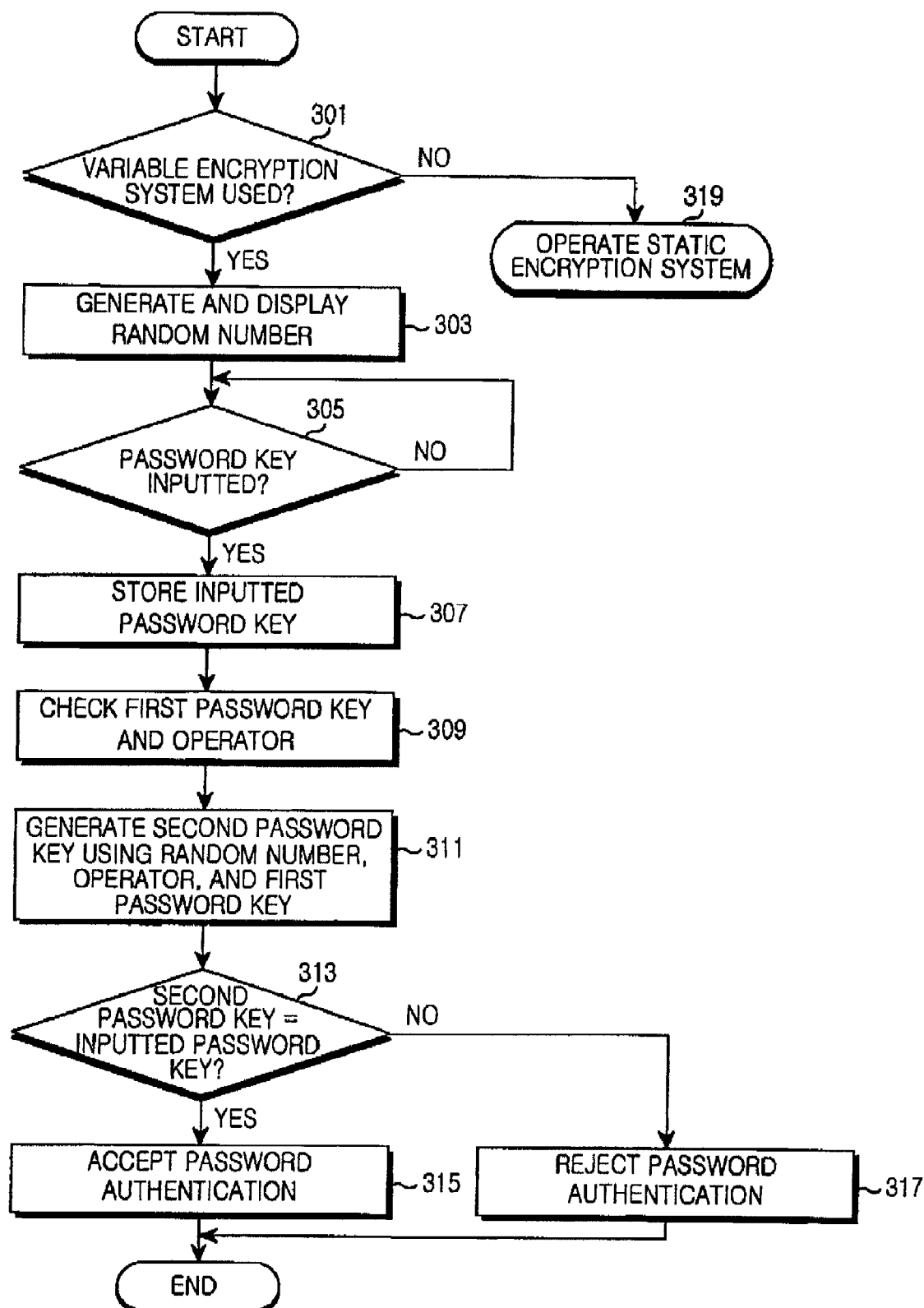
FIG. 3 is a flowchart illustrating a method for dynamically changing a password according to an exemplary embodiment of the present invention.

FIG. 3 is a flowchart illustrating a method for dynamically changing a password according to an exemplary embodiment of the present invention.

Referring to FIG. 3, in step 301 when the user tries the password authentication, the apparatus determines if the variable encryption system is used.

When the variable encryption system is not used, the apparatus proceeds to step 319 to operate a static encryption system. That is, the apparatus determines whether to accept the password authentication by comparing a password inputted through a user's key manipulation with a password previously stored.

In step 303, when the variable encryption system is used, the apparatus generates a random number and displays the generated random number on the display unit 108 so that the user can check it.

In step 305, the apparatus determines if a password key for an authentication is input through a user's key manipulation. At this point, the user inputs the password key for the authentication by using the random number displayed on the display unit 108 and the operator and the first password key previously set.

In step 307, when the password key for the authentication is input through the user's key manipulation, the apparatus stores the inputted password key in the storage unit 102.

In step 309, the apparatus confirms the first password key and the operator previously stored in the storage unit 102.

In step 311, the apparatus generates the second password key through the operation of the first password key and the random number.

In step 313, the apparatus compares the second password key with the password key input by the user. That is, the apparatus determines whether to accept the password authentication.

In step 317, when the second password key does not coincide with the inputted password key, the apparatus rejects the password authentication and displays a warning message indicating that the user is not allowed to access the personal information and asset information. Then, the apparatus terminates the algorithm.

In step 315, when the second password key coincides with the inputted password key, the apparatus accepts the password authentication and allows the user to access the personal information and asset information. Thereafter, the apparatus terminates the algorithm.

As described above, the password exposure can be prevented by dynamically changing the password using the random number, the operator, and the first password key. The operation of the random number and the first password key is performed based on digit. For example, the dynamic password key can be generated as illustrated in Table 1 below. It is assumed that the first password key is "1234".

TABLE 1

| Random number | Operator | | | | |
|---|---|---|---|---|---|
| | + | − | × | ÷ | % |
| 2345 | 3579 | 1111 | 2620 | 0000 | 1234 |
| 652251 | 3485 | 1023 | 2454 | 0104 | 1030 |
| 5 | 1239 | 1231 | 1230 | 0000 | 0004 |
| 1900 | 2134 | 0834 | 1800 | 1000 | 0200 |
| 45 | 1279 | 1211 | 1220 | 0000 | 0034 |
| 90931 | 1165 | 1703 | 0894 | 0014 | 0200 |

As illustrated in Table 1, the rightmost side is set with the smallest unit like in general mathematics and the operation is performed only on the same digits as the first password key. In the case of the random number "652251", the second password key is generated using "2251" in order to match its digits with those of the first password key.

In the modulo operation (%) and the division operation (÷), when a divisor or a dividend is 0 (i.e., indeterminate or impossible), the corresponding operations are processed as "0". For example, 4%20, 4%3=1, 3%4=3, 3%0=0, 4/3=1, 0/3=0, and 5/0=0.

The subtraction operation is performed using an absolute value. In this case, a carry discarded and numbers of the same digits are taken. For example, in the case of "4+8=12", "1" is discarded and "2" is taken.

In addition to the operation of the numbers, the operation of characters is also possible. That is, the second password key can be generated using ASCII Codes of the characters. However, because the general persons are unfamiliar with ASCII Codes, the second password key can be generated only through the operation of the numbers except the characters as illustrated in Table 2 below. In Table 2, it is assumed that the first password key is "AB123".

TABLE 2

| Random number | Operator | | | | |
|---|---|---|---|---|---|
| | + | − | × | ÷ | % |
| 2345 | AB468 | AB222 | AB385 | AB000 | AB123 |
| 652251 | AB374 | AB132 | AB203 | AB003 | AB120 |

As can be seen from Table 2 above, the second password key is generated using only the numbers except the characters.

As described above, the password key is dynamically changed using the operator selected by a user and the random number. Thus, the password exposure can be prevented and the personal information and asset information can be protected without using additional devices.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A password authentication method comprising the steps of:
   storing, by a storage unit, an original password and an operator input by a user;
   generating, by a random number generation unit, a random number when performing a password authentication;
   displaying, by a display unit, the random number;
   checking, by a password authentication unit, a numerical password input by the user;
   checking the original password and the operator, and changing, by a dynamic password generation unit, the original password by performing the operation of the random number and the original password based on the operator; and
   determining, by the password authentication unit, whether to accept a password authentication by comparing the input numerical password with the changed password,
   wherein the operator is a mathematical operator that operates on a whole number, with the original password and the changed password being whole numbers.

2. The password authentication method of claim 1, wherein the password authentication is accepted when the input numerical password coincides with the changed password.

3. The password authentication method of claim 1, wherein the password authentication is rejected when the inputted numerical password does not coincide with the changed password.

4. An apparatus for dynamically changing a password, the apparatus comprising:
   a storage unit for storing an original numerical password and an operator previously set by a user;
   a random number generation unit for generating a random number;
   a dynamic password generation unit for changing the original numerical password by performing an operation of the original numerical password and the random number based on the operator input by the user; and
   a password authentication unit for determining whether to accept authentication of the input numerical password by comparing the input numerical password with a password changed by the dynamic password generation unit,
   wherein the operator is a mathematical operator that operates on a whole number, with the original password and the changed password being whole numbers.

5. The apparatus of claim 4, further comprising an input unit for receiving a password inputted by the user.

6. The apparatus of claim 4, further comprising a display unit for displaying the generated random number.

* * * * *